United States Patent
Beyer et al.

(10) Patent No.: US 9,670,822 B2
(45) Date of Patent: Jun. 6, 2017

(54) BORE BRIDGE AND CYLINDER COOLING

(71) Applicant: Ford Global Technologies, LLC, Dearborn, MI (US)

(72) Inventors: Theodore Beyer, Canton, MI (US); John Christopher Riegger, Ann Arbor, MI (US); Jody Michael Slike, Farmington Hills, MI (US); Mohammed Yusuf Ali, Dearborn, MI (US); Ian Cattermole, Brighton, MI (US); Mathew Leonard Hintzen, Stockbridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 14/479,659

(22) Filed: Sep. 8, 2014

(65) Prior Publication Data

US 2016/0069248 A1    Mar. 10, 2016

(51) Int. Cl.
| F01P 3/02 | (2006.01) |
| F02F 1/40 | (2006.01) |
| F16J 15/08 | (2006.01) |
| F02F 11/00 | (2006.01) |
| F02F 1/16 | (2006.01) |

(52) U.S. Cl.
CPC ............. *F01P 3/02* (2013.01); *F16J 15/0825* (2013.01); *F01P 2003/028* (2013.01); *F02F 1/16* (2013.01); *F02F 1/40* (2013.01); *F02F 11/002* (2013.01); *F16J 2015/0868* (2013.01)

(58) Field of Classification Search
CPC ........ F02F 1/14; F02F 1/10; F02F 1/40; F02F 2001/104; F02F 1/166; F02F 11/002; F02F 7/007; F01P 3/02; F01P 2003/021; F01P 2003/024; F01P 7/14
USPC ....... 123/41.67–41.74, 193.1–193.5, 41.82 R
See application file for complete search history.

(56) References Cited

U.S. PATENT DOCUMENTS

| | | | |
|---|---|---|---|
| 5,474,040 A * | 12/1995 | Murakami | F02F 7/0007 123/193.2 |
| 6,406,032 B1 * | 6/2002 | Miyaoh | F16J 15/0825 277/594 |
| 6,776,127 B2 * | 8/2004 | Osman | F02F 1/14 123/41.72 |
| 6,901,891 B2 | 6/2005 | Suzuki et al. | |
| 7,032,547 B2 * | 4/2006 | Xin | F02F 1/14 123/41.72 |
| 7,278,381 B2 * | 10/2007 | Matsutani | F01P 3/02 123/41.74 |
| 8,261,702 B2 * | 9/2012 | Fedeson | F01P 3/02 123/41.82 R |
| 8,555,825 B2 | 10/2013 | Lenz et al. | |
| 2007/0170659 A1 * | 7/2007 | Hatamura | F16J 15/0818 277/595 |

(Continued)

*Primary Examiner* — Long T Tran
(74) *Attorney, Agent, or Firm* — Brooks Kushman P.C.; Greg P. Brown

(57) ABSTRACT

An engine includes a cylinder block with first and second saw cuts intersecting a block face on opposed sides of a block bore bridge. A cylinder head has third and fourth saw cuts intersecting a head face on opposed sides of a head bore bridge. A gasket is placed between the block and the head. The gasket defines a cooling passage adapted to fluidly connect the first, second, third and fourth saw cuts and cool the interbore region of the engine. The cooling passage has an inlet and a pair of outlets.

16 Claims, 6 Drawing Sheets

(56) References Cited

U.S. PATENT DOCUMENTS

| | | | |
|---|---|---|---|
| 2011/0023799 A1* | 2/2011 | Lenz | F01P 3/02 |
| | | | 123/41.79 |
| 2012/0031354 A1* | 2/2012 | Beyer | F02F 1/243 |
| | | | 123/41.79 |
| 2013/0333658 A1 | 12/2013 | Yamamoto | |

* cited by examiner

BORE BRIDGE AND CYLINDER COOLING

TECHNICAL FIELD

Various embodiments relate to cooling passages for a bore bridge between two cylinders in an internal combustion engine.

BACKGROUND

In a water-cooled engine, sufficient cooling may need to be provided to the bore bridge between adjacent engine cylinders. The bore bridge on the cylinder block and/or the cylinder head is a stressed area with little packaging space. In small, high output engines, due to packaging, the thermal and mechanical stresses may be increased. Higher bore bridge temperatures typically cause bore bridge materials to weaken and may reduce fatigue strength. Thermally weakened structure and thermal expansion of this zone may cause bore distortion that can be problematic to overall engine functionality such as, for example, piston scuffing, sealing functionality and durability of the piston-ring pack. Additionally, high temperatures at the bore bridge area also limit the reliability of the gasket in this zone, which in turn may cause combustion gas and coolant leaks, and/or reduced engine power output and overheating.

SUMMARY

According to an embodiment, an internal combustion engine has a cylinder block defining a block deck face, first and second cylinders, and a block cooling jacket. The first and second cylinders are adjacent to one another and separated by a block bore bridge. The engine has a cylinder head having a head deck face defining first and second chambers, and a head cooling jacket. The first and second chambers are adjacent to one another and separated by a head bore bridge. The first chamber and the first cylinder form a first combustion chamber, and the second chamber and the second cylinder form a second combustion chamber. The engine also has a head gasket positioned between the cylinder block and the cylinder head. The head gasket has a block side and a head side. The block cooling jacket has a first saw cut and a second saw cut intersecting the block deck face on either side of the block bore bridge. The head cooling jacket has a first channel and a second channel intersecting the head deck face on either side of the head bore bridge. The head gasket defines a cooling passage adapted to fluidly connect the first and second saw cuts with the first and second channels such that coolant flows from the block jacket to the head jacket to cool the associated bore bridge.

According to another embodiment, an engine has a cylinder block with first and second saw cuts intersecting a block face on opposed sides of a block bore bridge. The engine has a cylinder head with third and fourth saw cuts intersecting a head face on opposed sides of a head bore bridge. A gasket is placed between the block and the head. The gasket defines a y-shaped passage adapted to fluidly connect the first, second, third and fourth saw cuts.

According to yet another embodiment, a head gasket for an engine having a cooling jacket is provided. A generally planar gasket body has a first side for cooperation with a cylinder head deck face, and a second side for cooperation with a cylinder block deck face. The gasket has formed therein a cooling passage extending through the gasket body and having an inlet, a first outlet, and a second outlet. The inlet to the cooling passage is adjacent to a cylinder block bore bridge with first and second opposed saw cuts formed therein. The inlet is positioned to fluidly connect the first and second saw cuts with the cooling passage. The inlet is transversely elongated on the gasket to overlay the cylinder block bore bridge. The first outlet from the cooling passage is adjacent to a third saw cut in a cylinder head bore bridge. The first outlet is positioned to fluidly connect the cooling passage with the third saw cut. The second outlet from the cooling passage is adjacent to a fourth saw cut in a cylinder head bore bridge. The fourth saw cut is opposed from the third saw cut. The second outlet is positioned to fluidly connect the cooling passage with the fourth saw cut. The first and second outlets are spaced apart transversely on the gasket.

Various embodiments of the present disclosure have associated, non-limiting advantages. For example, a block cooling jacket includes a pair of saw cuts in the bore bridge or interbore region of the engine block. A head cooling jacket also includes a pair of saw cuts or a pair of cooling channels extending from core prints into the bore bridge or interbore region of the engine head. The pair of saw cuts on each of the block and the head are spaced apart from one another by an intermediate region of the interbore region. A head gasket is positioned between the engine block and the head and provides a fluid passage connecting the saw cuts of the block cooling jacket with the saw cuts of the head cooling jacket. The gasket and saw cuts provide for coolant flow directly across the bore bridge region for increased heat transfer and cooling of the interbore region. The saw cuts and fluid passage in the gasket cause coolant fluid to change direction and impinge, thereby further increasing heat transfer at the bore bridge.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
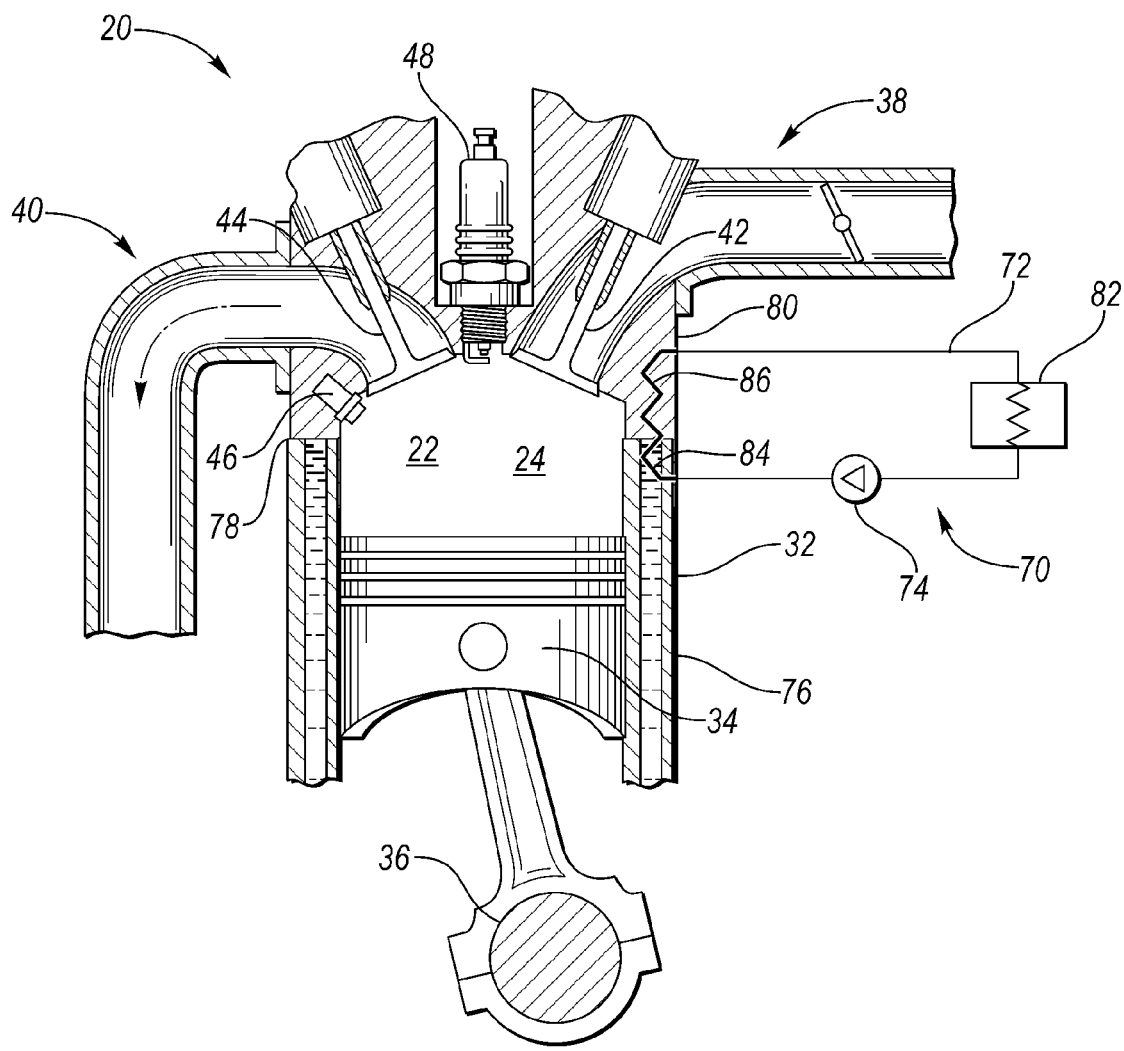
FIG. 1 illustrates a schematic of an engine configured to implement the disclosed embodiments.

FIG. 1 illustrates a schematic of an internal combustion engine 20. The engine 20 has a plurality of cylinders 22, and one cylinder is illustrated. The engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an after treatment system such as a catalytic converter.

The intake and exhaust valve 42, 44 positions and timing, as well as the fuel injection timing and ignition timing may be varied for the various engine strokes.

The engine 20 includes a cooling system 70 to remove heat from the engine 20. The amount of heat removed from the engine 20 may be controlled by a cooling system controller or the engine controller. The cooling system 70 may be integrated into the engine 20 as a cooling jacket. The cooling system 70 has one or more cooling circuits 72 that may contain water or another coolant as the working fluid. In one example, the cooling circuit 72 has a first cooling jacket 84 in the cylinder block 76 and a second cooling jacket 86 in the cylinder head 80 with the jackets 84, 86 in fluid communication with each other. The block 76 and the head 80 may have additional cooling jackets. Coolant, such as water, in the cooling circuit 72 and jackets 84, 86 flows from an area of high pressure towards an area of lower pressure.

The cooling system 70 has one or more pumps 74 that provide fluid in the circuit 72 to cooling passages in the cylinder block 76. The cooling system 70 may also include valves (not shown) to control the flow or pressure of coolant, or direct coolant within the system 70. The cooling passages in the cylinder block 76 may be adjacent to one or more of the combustion chambers 24 and cylinders 22, and the bore bridges formed between the cylinders 22. Similarly, the cooling passages in the cylinder head 80 may be adjacent to one or more of the combustion chambers 24 and cylinders 22, and the bore bridges formed between the combustion chambers 24. The cylinder head 80 is connected to the cylinder block 76 to form the cylinders 22 and combustion chambers 24. A head gasket 78 in interposed between the cylinder block 76 and the cylinder head 80 to seal the cylinders 22. The gasket 78 may also have a slot, apertures, or the like to fluidly connect the jackets 84, 86, and selectively connect passages between the jackets 84, 86. Coolant flows from the cylinder head 80 and out of the engine 20 to a radiator 82 or other heat exchanger where heat is transferred from the coolant to the environment.

Figure 2:
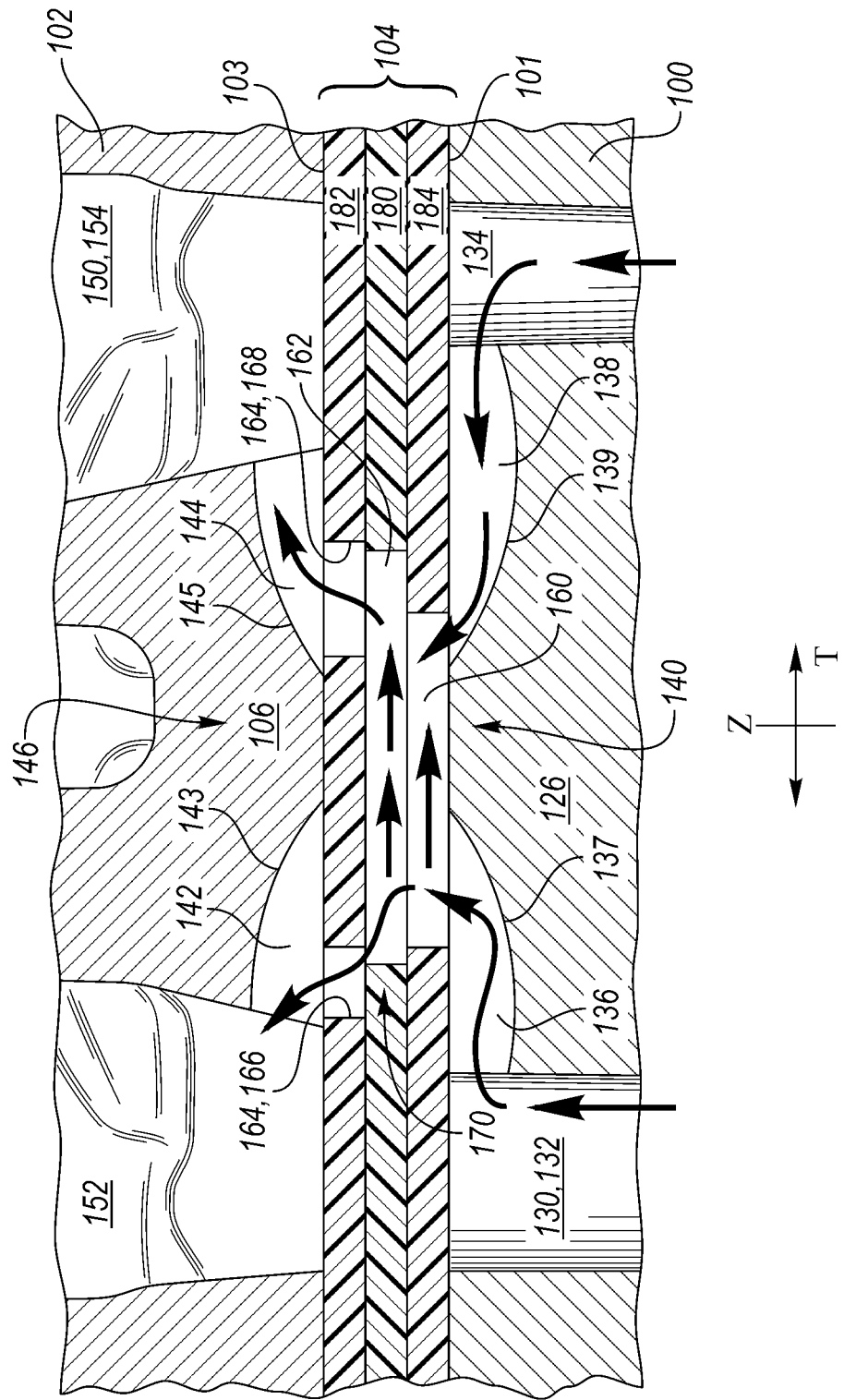
FIG. 2 illustrates a schematic of cooling paths for an interbore region of an engine according to an embodiment.
Figure 3:
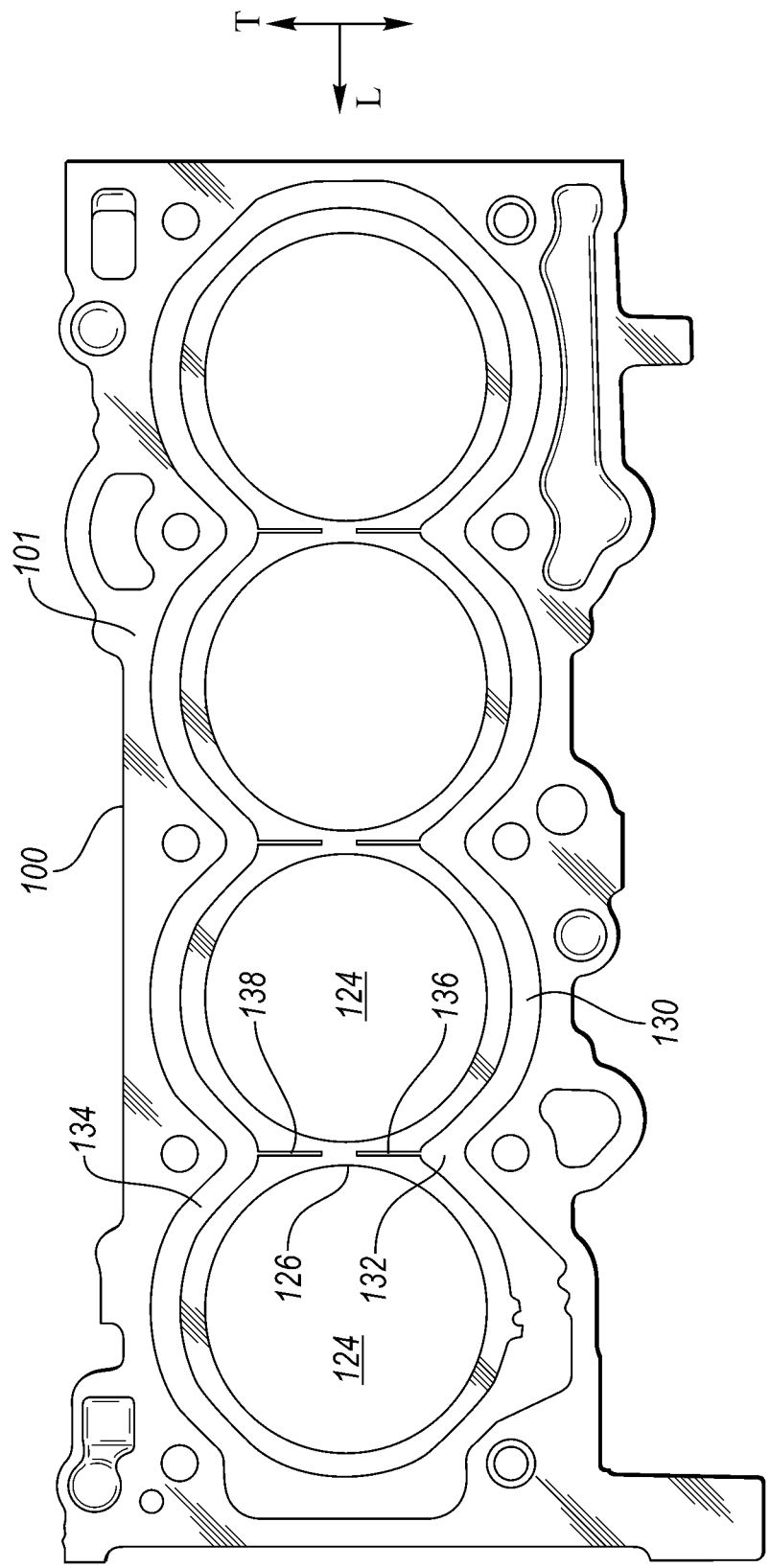
FIG. 3 illustrates a perspective view of a cylinder block according to an embodiment.
Figure 4:
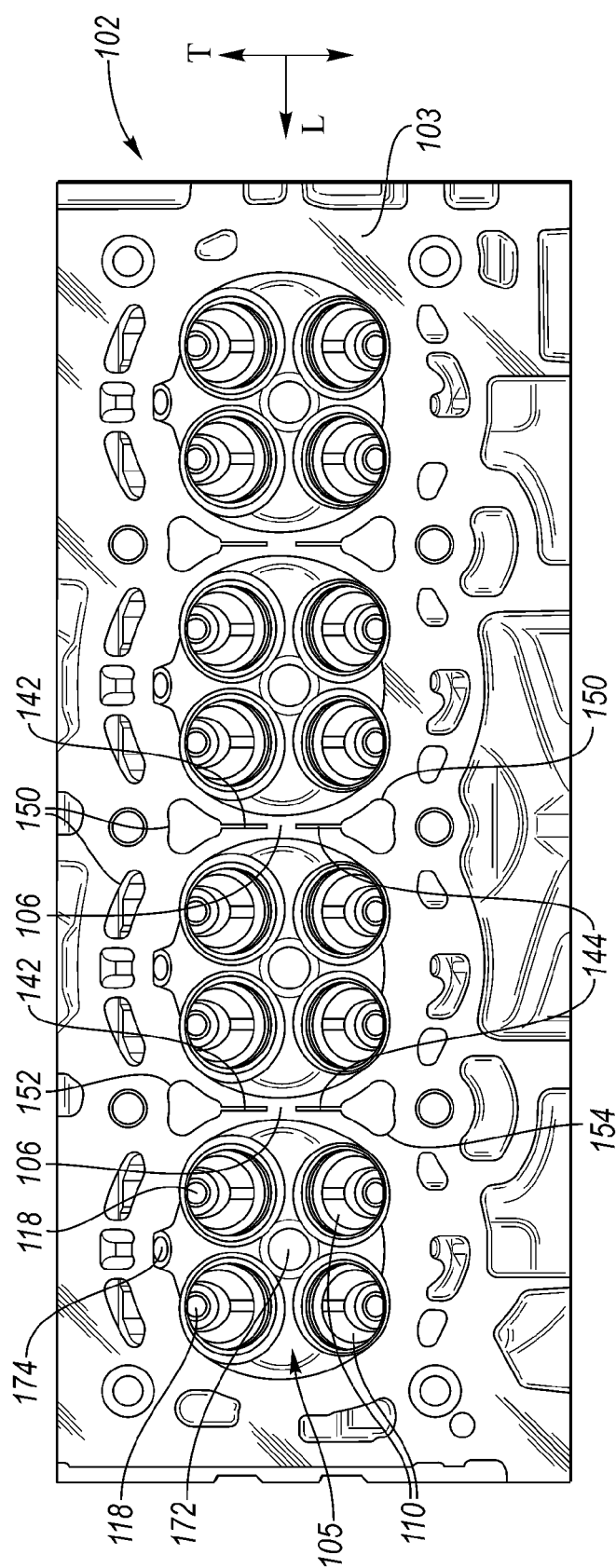
FIG. 4 illustrates a perspective view of a cylinder head according to an embodiment.
Figure 5:
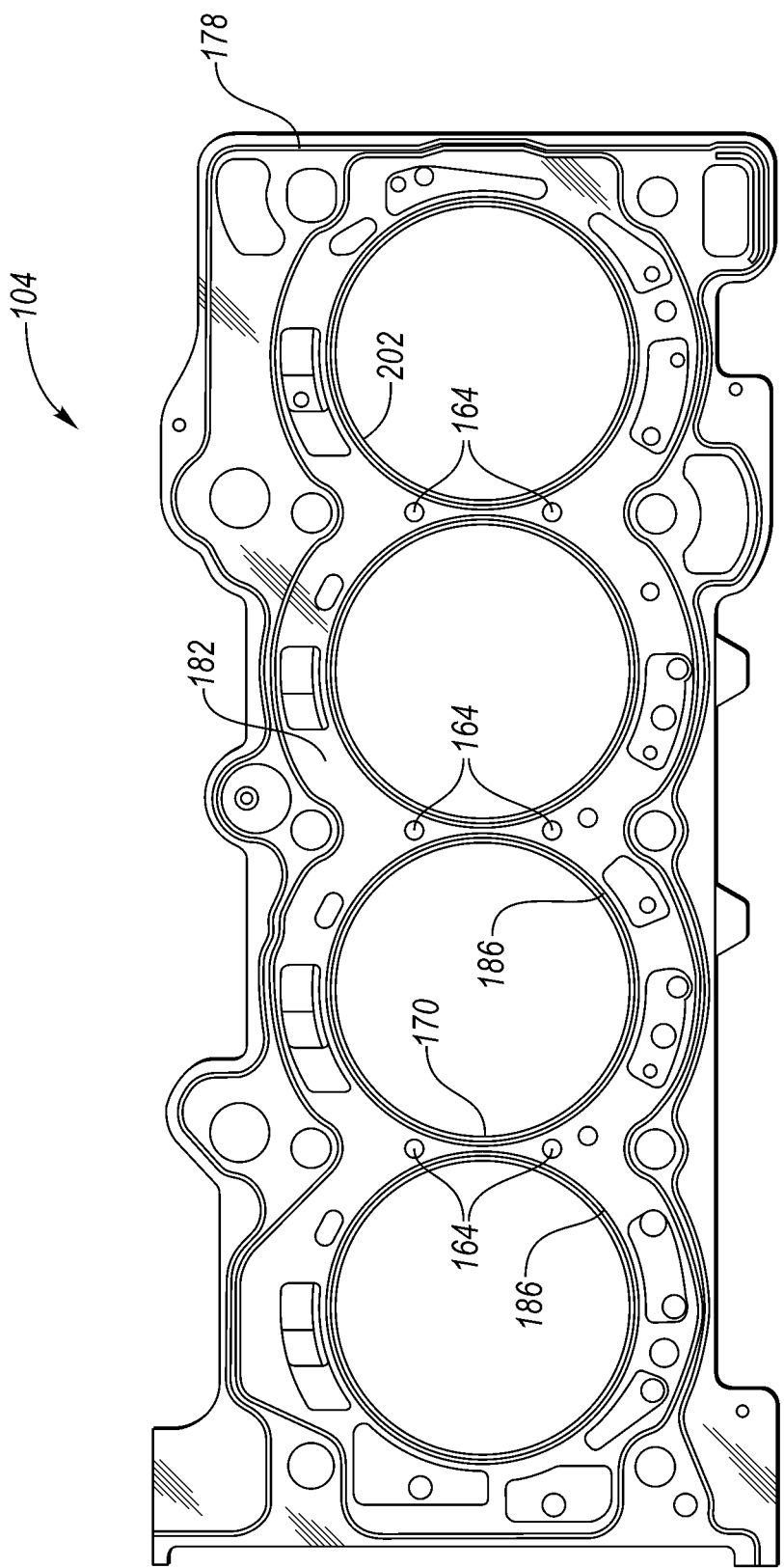
FIG. 5 illustrates a perspective view of a head gasket according to an embodiment.

FIGS. 2-4 illustrate an example of the present disclosure. FIG. 2 illustrates a schematic of fluid flow across a bore bridge according to an example of the present disclosure. FIG. 3 illustrates the cylinder block. FIG. 4 illustrates the cylinder head. FIG. 5 illustrates the head gasket.

The cooling system of FIG. 2 may be implemented on the engine illustrated in FIG. 1. FIG. 2 illustrates cooling paths across both the cylinder head bore bridge 106 and the cylinder block bore bridge 126 to cool the interbore region of the engine. The cylinder block 100 of the engine is connected to the cylinder head 102 using a head gasket 104 to form a combustion chamber in the engine. The deck face 101 of the cylinder block 100 and the deck face 103 of the cylinder head 102 are in contact with first and second opposed sides of the gasket 104.

Between adjacent chambers 105 in the cylinder head 102 are bore bridges 106. Between adjacent cylinders 124 in the block 100 are bore bridges 126. The chambers 105 and the cylinders 124 cooperate to form combustion chambers for the engine. The gasket 104 may include a bead on each side of the gasket and surrounding the chambers 105 and cylinders 124 to help seal the combustion chambers of the engine.

Coolant flow from the block cooling jacket 130 to the head cooling jacket 150 across the bore bridge 126 and bore bridge 106. The block cooling jacket 130 includes passages 132, 134. The head cooling jacket 150 includes passages 152, 154. Passages 132, 152 are on the intake side of the head 102. Passages 134, 154 are on the exhaust side of the cylinder head 102. The jacket 150 is at a lower pressure than jacket 130 such that coolant flow from the block jacket 130 to the head jacket 150.

The bore bridge 126 may include a pair of saw cuts 136, 138 or slots, in the deck face 101. The saw cut 136 is connected to the passage 132 and spaced apart from a longitudinal axis of the block, or spaced apart from a center region 140 of the bore bridge 126. The saw cut 138 is connected to the passage 134 and spaced apart from a longitudinal axis of the block, or spaced apart from a center region 140 of the bore bridge 126. The saw cuts 136, 138 may be machined grooves. The saw cuts 136, 138 may be sized similarly to one another and have a decreasing depth relative to the deck face 101 towards the center region 140. In one embodiment, the edge 137 of the saw cut 136 is an arc of a circle, and the edge 139 of the saw cut 138 is an arc of a circle. In one example, the radius of curvature of each saw cut 136, 138 is the same, and in a further example, the radius of curvature may be 50 mm with each saw cut having a maximum depth from the deck face 101 to the edge 137, 139 of 5 mm. In other examples, the saw cuts 136, 138 may have a parabolic or other shape. In a non-limiting embodiment, the ratio between the total length of block bore bridge 126 along a transverse axis and the spacing of sawcuts in middle region is about 5.8:1. In a non-limiting example, the ratio between the minimum width of block bore bridge 126 along a longitudinal axis and the width of saw cut is about 7.7:1. In another example, the width of the saw cuts is approximately from 1.0-1.4 mm, although other dimensions are also contemplated, for example, based on the bore bridge dimensions.

The bore bridge 106 may include a pair of saw cuts 142, 144 or slots, in the deck face 103. The saw cut 142 is connected to the passage 152 and spaced apart from a longitudinal axis of the head, or spaced apart from a center region 146 of the bore bridge 106. The saw cut 144 is connected to the passage 154 and spaced apart from a longitudinal axis of the head, or spaced apart from a center region 146 of the bore bridge 106. The saw cuts 142, 144 may be machined grooves. The saw cuts 142, 144 may be sized similarly to one another and have a decreasing depth relative to the deck face 103 towards the center region 146. In one embodiment, the edge 143 of the saw cut 142 is an arc of a circle, and the edge 145 of the saw cut 144 is an arc of a circle. In one example, the radius of curvature of each saw cut 142, 144 is the same, and in a further example, the radius of curvature may be 50 mm with each saw cut having a maximum depth from the deck face 103 to the edge 143, 145 of 5 mm. In other examples, the saw cuts 142, 144 may have a parabolic or other shape. The saw cuts 136, 138, 142, 144 may be generally the same size and shape with mirrored positioning to one another. In a non-limiting embodiment, the ratio between the total length of head bore bridge 106 along a transverse axis and the spacing of sawcuts in middle region is about 4.6:1. In a non-limiting example, the ratio between the minimum width of head bore bridge 106 along a longitudinal axis and the width of saw cut is about 8.5:1. In another example, the width of the saw cuts is approximately from 1.0-1.4 mm, although other dimensions are also contemplated, for example, based on the bore bridge dimensions.

The gasket 104 has one or more passages formed in the body of the gasket to provide a fluid connection between the block jacket 130 and the head jacket 150 in the interbore region. Flow across the interbore region is illustrated by arrows in FIG. 2. One or more block side layers 184 may have a slot 160 or passage formed therein such that the saw cuts 136, 138 are in fluid communication across the bore bridge 126 and deck face 101.

One or more middle layers 180 may include a slot 162 or passage in fluid communication with and overlapping the slot 160 to receive coolant therefrom.

One or more upper layers 182 of the gasket may include one or more slots 164 or passages in fluid communication with and overlapping the slot 162 to receive coolant therefrom and provide coolant to the saw cuts 142, 144. In the example shown, a first slot or passage 166 is in fluid communication with the slot 162 and the saw cut 142, and a second slot or passage 168 is in fluid communication with the slot 162 and the saw cut 144. The slot 166 may be overlapping and partially offset from slot 162. The slot 168 may be overlapping and partially offset from slot 162. The slots 166, 168 are spaced apart from one another, with each slot 166, 168 on either side of the longitudinal axis. The slots 166, 168 may have equivalent cross sectional areas. In the example shown, the slots 166, 168 have different cross sectional areas, with slot 168 having a greater area than slot 166. Slot 168 also has a greater degree of overlap than slot 166, thereby providing for control of coolant flow to the respective saw cuts 142, 144.

The slots 160, 162, 164 in the gasket 104 provide a generally y-shaped cooling passage 170. The slot 160 provides an inlet to the passage 170. The slots 166, 168 provide for first and second outlets, respectively, from the cooling passage 170. The lower two slots 160, 162 generally provide for bridge 126 cooling while the upper layer 182 and slots 166, 168 meter and direct the coolant flow. Coolant flow in the saw cut 136 and saw cut 138 is directed to the bridge 126 region. The slot 166 may restrict coolant flow to the saw cut 142 to partially mask the saw cut 142 and encourage flow from the saw cut 136 to flow across the bridge 126. The cross sectional area of the slot 168 may be relatively larger than that of the slot 166 to encourage coolant flow through the cooling passage 170 to the saw cut 144. As can be seen from FIG. 2, the slot 162 overlies and has a greater length that inlet slot 160. The slots 166, 168 are overlapping and partially offset from the slot 162.

Coolant flows to the upper head cooling jacket 150 from the passages 132, 134, across the bore bridge 126 to cool the bridge 126, and to saw cuts 142, 144 to cool the bridge 106, and then to the upper cooling jacket 150. The saw cuts 136, 138, 142, 144 and the cooling passage 170 in the gasket provide for a means of cooling the bridge 106, 126. Higher cooling rates are provided when the saw cuts are closer to the longitudinal axis. More sealing land for the gasket is provided when the saw cuts are farther from the longitudinal axis. The proximity of the saw cuts to the longitudinal axis may also be based on the gasket, and the bore bridge width and diameter. The cooling passage 170 in the gasket is designed to prevent coolant flow from the block jacket directly to the head jacket. Pressurized coolant is directed through the block side saw cuts and into the head side saw cuts. Coolant flow closest to the bridge 126 changes direction abruptly based on the geometry of the system, and this causes coolant impingement on the surfaces of the bridge 126 which increases heat transfer from the bridge. In one example, the cooling passage arrangement 170 provides for coolant flow on the order of 0.005 kg/s across the bore bridge with a velocity on the order of 4 m/s during engine operation. In other examples, the coolant flow and/or velocity may be higher or lower.

The interbore cooling arrangement as shown in FIG. 2 also provides for structural support in the interbore region of the engine while also providing for yield under thermal expansion during engine operation. Additionally, the interbore cooling arrangement as shown in FIG. 2 may be both easier to implement and lower cost than cross drilling or providing a passage using a lost core method, and manufacturing cycle time may be reduced.

FIG. 3 illustrates a schematic of the cylinder block 100 with a deck face 101 employing an embodiment of the present disclosure. The cylinder block 100 may be cast out of a suitable material such as aluminum. The cylinder block 100 is a component in an in-line four cylinder engine, although other engine configurations may also be used with the present disclosure. Various passages are provided on the deck face 101 and in the block 100 to form the cooling jacket 130. The bore bridge 126 is shown between adjacent cylinders 124. The saw cuts 136, 138 are illustrated for each bore bridge 126, and are spaced apart from the longitudinal axis, L, of the engine.

FIG. 4 illustrates a schematic of the cylinder head 102 with a deck face 103 employing an embodiment of the present disclosure and for use with the block 100 shown in FIG. 3. The cylinder head 102 may be cast out of a suitable material such as aluminum. The cylinder head 102 has a deck face 103 or bottom face that forms chambers 105. Each chamber 105 cooperates with a corresponding cylinder 124 in a cylinder block to form a combustion chamber. Each chamber 105 has a pair of intake ports 118 sized to receive intake valve seats and intake valves. Each chamber 105 also has a pair of exhaust ports 110 sized to receive exhaust valve seats and exhaust valves. A port 174 is provided for an injector, and another port 172 is provided for a spark plug. Various passages are also provided on the deck face 103 and within the cylinder head 102 that form the head cooling jacket 150.

The bore bridge 106 is shown between adjacent combustion chambers 105. The saw cuts 142, 144 are illustrated for each bore bridge 106, and are spaced apart from the longitudinal axis, L, of the engine.

The bore bridges 106, 126 provide an interbore region for the engine that may require cooling with engine operation as the temperature of the interbore region may increase due to conduction heating from hot exhaust gases in the combustion chamber.

With reference to FIGS. 3 and 4, coolant in the engine may travel along the longitudinal axis or longitudinal direction of the engine such that coolant is provided to the cylinders in a sequential manner.

FIG. 5 illustrates a head gasket 104 that cooperates with the cylinder head 102 of FIG. 3 and the cylinder block of FIG. 4 to form the cylinders of the engine and the cooling paths as shown in FIG. 2. The cylinder head side of the gasket is illustrated. Coolant in the cooling system may flow across the gasket 104 to cool the interbore region. The gasket 104 has a generally planar gasket body 178 that defines various apertures corresponding to bolt holes or other components of the engine. The gasket body 178 forms or defines cooling passages 170, with a cooling passage 170 provided between adjacent beads 186 and in the interbore region of the engine. The cooing passage 170 has slots 164 that cooperate with the saw cuts 142, 144 as shown in FIG. 2 to form a cooling path between the block jacket 130 and the head jacket 150. In one example, the gasket 104 is constructed from multiple layers 180, 182, 184 as shown in FIG. 2, and each layer may be made from steel or another suitable material. The cooling passage 170 may be formed by stamping the outer layers and center layers of the gasket, or by another process as is known in the art. The passages 170 may be formed by selectively removing gasket material from one or more layers to form a coolant path from the block to the head across one or more bore bridges. Slots may be provided in each layer of the gasket that cooperate to form the coolant path across the gasket, and slots in different layers may be the same length, different lengths, and may be aligned or offset to provide the desired coolant flow pattern. Additionally, passages 170 may by the same size and shape or may vary in size and shape based on their position with respect to the engine and the desired coolant flow across the respective interbore region.

Figure 6:
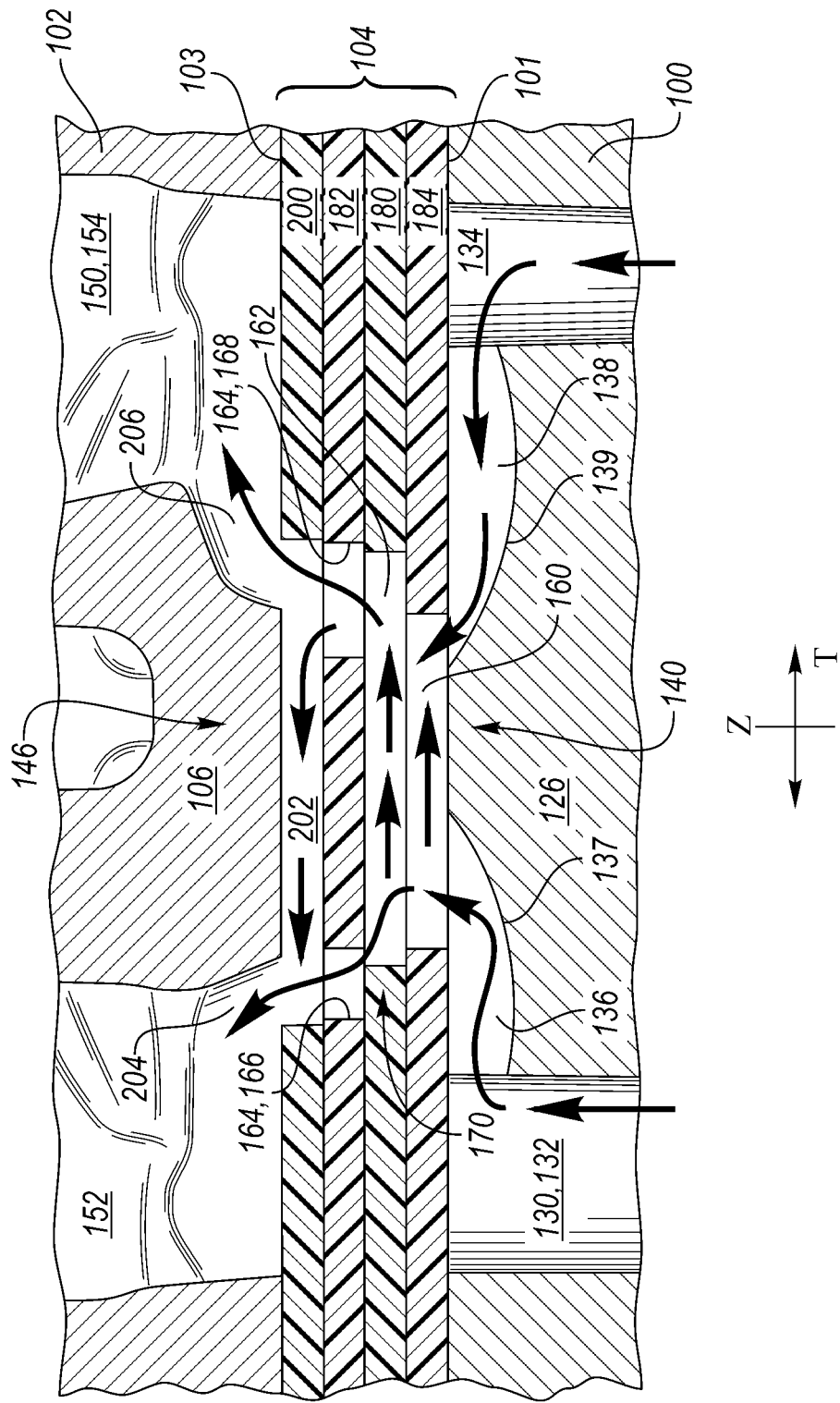
FIG. 6 illustrates a schematic of cooling paths for an interbore region of an engine according to another embodiment.

FIG. 6 illustrates another embodiment of a cooling passage 170 and arrangement for use with the engine of FIG. 1. Reference numerals in FIG. 6 correspond to those of FIG. 2 for similar elements. The cylinder block has a pair of sawcuts 136, 138, with one on either side of the bore bridge 126 and connected to respective passages or core prints 132, 134. The gasket 104 has an additional layer 200, which may provide a new top layer for the gasket 104. Layer 200 may be the same thickness as the other layers, or may be thinner than the other layers. The layer 200 has a slot 202 positioned to fluidly connect the apertures 166, 168 and positioned along the length of the bore bridge 106. The slot 202 may provide some coolant flow along the head side bore bridge to cool the bridge 106. The coolant flow along bore bridge 106 may be less than the coolant flow along bore bridge 126 and through slot 160.

The passage 152 in the cylinder head 102 may be a core print. The core print may be extended into the bore bridge 106 region as a channel or inlet region 204. The inlet region 204 receives coolant from the block cooling jacket and across the gasket 104. The channel 204 provides cooling for the bore bridge 106 as well.

The passage 154 in the cylinder head 102 may also be a core print. The core print 154 may be extended into the bore bridge 106 region as another channel or inlet region 206. The inlet region 206 receives coolant from the block cooling jacket and across the gasket 104. The channel 206 provides cooling for the bore bridge 106 as well. The channels 204, 206 may be provided instead of the saw cuts as there is additional structure in the head bore bridge region 106 to allow additional passageways. Additionally, the channels 204, 206 may be cast or otherwise formed with the core prints 152, 154 and the cooling jacket, while saw cuts require an additional machining step after forming the cylinder head and machining the deck face 103. It is less likely that similar channels would be provided in the cylinder block on either side of the bore bridge 126 based on the structure and less material and space in the block adjacent to the bore bridge 126, although in some engine configurations it may be feasible.

Various embodiments of the present disclosure have associated, non-limiting advantages. For example, a block cooling jacket includes a pair of saw cuts in the bore bridge or interbore region of the engine block. A head cooling jacket also includes a pair of saw cuts in the bore bridge or interbore region of the engine head. The pair of saw cuts on each of the block and the head are spaced apart from one another by an intermediate region of the interbore region. A head gasket is positioned between the engine block and the head and provides a fluid passage connecting the saw cuts of the block cooling jacket with the saw cuts of the head cooling jacket. The gasket and saw cuts provide for coolant flow directly across the bore bridge region for increased heat transfer and cooling of the interbore region. The saw cuts and fluid passage in the gasket cause coolant fluid to change direction and impinge, thereby further increasing heat transfer at the bore bridge.

While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An internal combustion engine comprising: a cylinder block defining a block deck face, first and second cylinders, and a block cooling jacket, wherein the first and second cylinders are adjacent to one another and separated by a block bore bridge; a cylinder head having a head deck face defining first and second chambers, and a head cooling jacket, the first and second chambers adjacent to one another and separated by a head bore bridge, wherein the first chamber and the first cylinder form a first combustion chamber, and the second chamber and the second cylinder form a second combustion chamber; and a head gasket positioned between the cylinder block and the cylinder head, the head gasket having a block side and a head side; wherein the block cooling jacket has a first saw cut and a second saw cut intersecting the block deck face on either side of the block bore bridge; wherein the head cooling jacket has a first channel and a second channel intersecting the head deck face on either side of the head bore bridge; and wherein the head gasket defines a cooling passage fluidly connecting the first and second saw cuts with the first and second channels such that coolant flows from the block jacket to the head jacket to cool the associated bore bridge, the cooling passage of the head gasket having an inlet on a block side of the gasket fluidly connected to a first outlet and a second outlet on a head side of the gasket; and wherein the cooling passage of the head gasket is y-shaped.

2. The internal combustion engine of claim 1 wherein the inlet of the cooling passage adjoins the first saw cut and the second saw cut and receives coolant from the first saw cut and second saw cut.

3. The internal combustion engine of claim 2 wherein the inlet of the cooling passage is a slot extending from the first saw cut to the second saw cut, the slot positioned to provide coolant flow along the block deck face and across the block bore bridge.

4. The internal combustion engine of claim 1 wherein the first outlet of the cooling passage adjoins the first channel and is positioned to provide coolant to the first channel; and
wherein the second outlet of the cooling passage adjoins the second channel and is positioned to provide coolant to the second channel.

5. The internal combustion engine of claim 4 wherein the first and second outlets of the head gasket are spaced apart along a transverse axis of the engine.

6. The internal combustion engine of claim 4 wherein the first channel is a third saw cut; and
wherein the second channel is a fourth saw cut.

7. The internal combustion engine of claim 6 wherein the first and second saw cuts increase in depth with increasing distance from the block bore bridge; and
wherein the third and fourth saw cuts increase in depth with increasing distance from the head bore bridge.

8. The internal combustion engine of claim 1 wherein the first outlet is spaced a first distance from a longitudinal axis of the engine, and wherein the second outlet is spaced a second distance from the longitudinal axis of the engine, the second distance different from the first distance.

9. The internal combustion engine of claim 1 wherein the first channel is an inlet region to a first core print; and
wherein the second channel is an inlet region to a second core print.

10. The internal combustion engine of claim 9 wherein the first channel is spaced a first distance from a longitudinal axis of the engine, and wherein the second channel is spaced a second distance from the longitudinal axis of the engine, the second distance different from the first distance.

11. The internal combustion engine of claim 1 wherein the inlet to the cooling passage of the gasket is positioned to fluidly connect the first and second saw cuts with the cooling passage, the inlet being transversely elongated on the gasket to overlay the cylinder block bore bridge;
wherein the first outlet from the cooling passage of the gasket is adjacent to the first channel, the first outlet being positioned to fluidly connect the cooling passage with the first channel;
wherein the second outlet from the cooling passage of the gasket is adjacent to second channel, the second outlet being positioned to fluidly connect the cooling passage with the second channel; and
wherein the first and second outlets are spaced apart transversely on the gasket.

12. The internal combustion engine of claim 1 wherein the gasket comprises a first layer, a second layer, and a third layer positioned therebetween;
wherein the first layer defines the inlet of the cooling passage as a first elongated slot;
wherein the third layer defines a second elongated slot for the cooling passage, wherein the second elongated slot overlies the first elongated slot and is configured to receive coolant therefrom; and
wherein the second layer defines first and second outlets spaced apart transversely at either end of the side of the second elongated slot.

13. An engine comprising:
a cylinder block having first and second saw cuts intersecting a block face on opposed sides of a block bore bridge;
a cylinder head having third and fourth saw cuts intersecting a head face on opposed sides of a head bore bridge; and
a gasket placed between the block and the head, the gasket defining a y-shaped passage fluidly connecting the first, second, third and fourth saw cuts to one another.

14. The engine of claim 13 wherein an inlet to the y-shaped passage of the gasket is a slot extending over at least a portion of the first saw cut, the block bore bridge, and at least a portion of the second saw cut.

15. The engine of claim 13 wherein a first outlet of the y-shaped passage extends over a portion of the third saw cut; and
wherein a second outlet of the y-shaped passage extends over a portion of the fourth saw cut.

16. The engine of claim 13 wherein the first and second saw cuts form a portion of a block cooling jacket;
wherein the third and fourth saw cuts form a portion of a head cooling jacket; and
wherein the head cooling jacket is at a lower pressure than the block cooling jacket during engine operation.

* * * * *